United States Patent
Kessler et al.

(10) Patent No.: US 6,870,339 B2
(45) Date of Patent: Mar. 22, 2005

(54) METHOD FOR OPERATING AN ELECTRICAL DRIVE UNIT

(75) Inventors: Erwin Kessler, Saulgau (DE); Wolfgang Schulter, Meersburg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 84 days.

(21) Appl. No.: 10/332,794

(22) PCT Filed: Jul. 3, 2001

(86) PCT No.: PCT/EP01/07578

§ 371 (c)(1),
(2), (4) Date: Jan. 10, 2003

(87) PCT Pub. No.: WO02/06615

PCT Pub. Date: Jan. 24, 2002

(65) Prior Publication Data

US 2003/0146724 A1 Aug. 7, 2003

(30) Foreign Application Priority Data

Jul. 13, 2000 (DE) ......................................... 100 34 014

(51) Int. Cl.⁷ ..................... G05B 19/4061; E05F 15/00; H02H 7/085
(52) U.S. Cl. ..................... 318/468; 318/456; 318/466; 49/26; 49/28
(58) Field of Search ............................. 318/280–286, 318/266, 466, 434, 432, 456, 468, 632, 630, 265; 49/26, 28; 388/903

(56) References Cited

U.S. PATENT DOCUMENTS

| | | | |
|---|---|---|---|
| 5,668,451 A | 9/1997 | Driendl et al. | |
| 5,734,245 A | 3/1998 | Terashima et al. | |
| 5,977,732 A * | 11/1999 | Matsumoto | 318/283 |
| 6,043,620 A | 3/2000 | Koestler | |
| 6,051,945 A * | 4/2000 | Furukawa | 318/280 |
| 6,070,116 A * | 5/2000 | Pruessel et al. | 318/466 |
| 6,086,177 A * | 7/2000 | Driendl et al. | 318/466 |
| 6,150,784 A | 11/2000 | Nagaoka | |
| 6,166,508 A * | 12/2000 | Kalb | 318/632 |
| 6,208,101 B1 * | 3/2001 | Seeberger et al. | 318/466 |
| 6,236,176 B1 * | 5/2001 | Uebelein et al. | 318/287 |
| 6,472,836 B1 * | 10/2002 | Uebelein et al. | 318/445 |
| 6,580,241 B1 * | 6/2003 | Sugawara | 318/443 |
| 6,605,911 B1 * | 8/2003 | Klesing | 318/286 |
| 6,710,562 B1 * | 3/2004 | Kalb et al. | 318/434 |

FOREIGN PATENT DOCUMENTS

| | | |
|---|---|---|
| DE | 3303590 | 8/1984 |
| DE | 4442171 | 6/1996 |
| DE | 19633941 | 2/1998 |
| DE | 19638781 | 3/1998 |
| DE | 19838144 | 2/1999 |
| DE | 19745597 | 4/1999 |
| DE | 19840162 | 3/2000 |

\* cited by examiner

*Primary Examiner*—David Martin
*Assistant Examiner*—Eduardo Colon Santana
(74) *Attorney, Agent, or Firm*—W. F. Fasse; W. G. Fasse

(57) ABSTRACT

The invention relates to a simple, economical and reliable method for providing anti-jamming protection. According to said method, the excess force—the difference between the driving force and the friction force—is compared with a trigger threshold. To this end, the curve of the friction force of the current actuation process, which is dependent on the actuation path of the electrical drive unit, is compared to the curve of the friction force of at least one previous actuation process and the trigger threshold value is modified according to how the friction force curves correspond. The invention also relates to a method for providing anti-jamming protection for an electrical drive unit for window lifting drives.

14 Claims, 1 Drawing Sheet

METHOD FOR OPERATING AN ELECTRICAL DRIVE UNIT

BACKGROUND INFORMATION

1. Field of the Invention

Electric drive units are used in a multitude of application areas for realizing driving operations of movable components by means of an external force. Various movable components or adjustable elements such as seats, side windows, sun roofs, sliding doors, etc., of motor vehicles are activated by electric drive units.

2. Description of Related Art

Such electric drive units comprise an electric motor, for example a d.c.-motor, for producing and providing electric drive power, a gear for translating the motion of the electric motor, a device for mechanically coupling or adapting the electric motor or the gear to the movable component or adjustable element, particularly for transforming the rotational movement of the electric motor into a linear movement, and an electronic module for controlling and monitoring the electric motor. For example, the r.p.m. and the power of the electric motor are controlled in a closed loop fashion. The driving power required for the electric driving unit lies in general between 100N and 500N.

The driving operations performed by means of an external force or electromotive force are frequently performable automatically in order to increase the comfort for the user or operator. Now the user or operator merely needs to initiate the driving operation and can pursue other activities during the automatic or fully automatic driving operation. However, when driving operations run automatically, particularly automatically running closing operations, that is, when automatic functions are realized for the closing operation, there is the danger of jamming of body parts or objects. This danger is particularly present where the user or operator does not further watch the driving operation or where the user or operator initiates the driving operation from a larger distance by remote control. Due to the substantial risk of injury connected with such jamming, regulations have already been passed which permit, for example automatically running closing operations only under certain preconditions to assure a certain protection against jamming. These regulations determine: the field of application, for example, window lifter and sun roofs of motor vehicles, the maximally permissible jamming force, for example 100 N, the testing bodies to be used for checking the effectiveness of the jamming protection, the testing body characteristics for example the elasticity, the spring rate and the geometry of the testing bodies, and the limiting conditions under which the jamming protection must become effective. In connection with motor vehicles the conditions are that the ignition key is removed and that the closing operation runs automatically.

It is possible to realize a jamming protection by implementing direct methods or indirect methods. In direct methods, the operating distance traversed by the movable component is monitored with regard to potential impediments. Monitoring applies particularly to openings to be closed. Monitoring is performed, for example, by installing switch panels or by optical means. Monitoring entails high costs and is trouble-prone. the jamming force generated when jamming occurs, is monitored in indirect methods. Jamming is assumed to exist if the driving force or a given excess force exceeds a predetermined threshold value or trigger threshold value. Following recognition of a jamming, certain measures are initiated. Particularly, the electric drive unit, namely the electric motor, can be reversed or switched off. The jamming force or excess force evaluated in connection with the indirect methods can be determined directly or indirectly. Direct determination is rather expensive due to the required sensors such as force sensors or torque sensors. Indirect determination requires acquisition and evaluation of measured values of at least one motor parameter that is characteristic for the loading of the electric motor or for the torque moment actually delivered by the electric motor. For example, the following may be evaluated, the drive r.p.m., and/or the current consumption, and/or the power input, and/or the energy consumption of the electric motor. Thus, the jamming force or the excess force is determined by evaluating the effect that the jamming force has on the electric motor of the electric drive unit in terms of a changed load to be driven.

The indirect determination of the jamming force is customarily used for cost reasons. For monitoring a system with an electric motor drive, it is known from German Patent Publication DE 44 42 171 A1 to take the friction force of the drive into account when determining the jamming force during an opening or closing operation. The friction force is ascertained at a point of time during an opening or closing operation when jamming has not yet occurred and a jamming force does not yet exist. The friction force is determined either indirectly or directly. Indirect determination may be performed on the basis of the motor parameters: motor current, or armature current, and/or motor voltage, and/or motor r.p.m. Direct determination is performed through suitable sensors at the electric motor. However, problems arise due to the substantial dependency of the driving force form temperature influences and aging influences and due to the non-reproducible friction characteristic of the electric drive unit. As a result, the jamming force or the excess force is substantially dependent on temperature variations, aging phenomena, and series variations, etc. Thus, for safety reasons and to avoid erroneous evaluations regarding the jamming, the trigger threshold value for the jamming force must be set at least as high as the not reproducible portion of the driving force, and thus of the friction force in the worst case scenario. On the other hand, the electric drive unit is subject to inertia, particularly the electric drive motor is subject to inertia. Therefore, the electric motor keeps running in the original direction for a certain time following recognition of a jamming and the switch-off or reversal of the electrical drive unit as a measure against a further force increase. Thus, for avoiding that a determined maximal jamming force is exceeded, it is necessary to already detect and evaluate as a jamming an excess force that is smaller than this maximal jamming force. For example, it is necessary to detect an excess force in the order of 50 N, so as not to exceed a jamming force of 100 N. In order to assure a jamming protection under these contrary limiting conditions the range of use of the electric drive unit is substantially limited.

SUMMARY OF THE INVENTION

It is an object of the invention to provide a method for operating an electric drive unit, which method has advantageous characteristics compared to the above, particularly the present method shall achieve a jamming protection without unnecessary limitations of the range of use of the electric drive unit, in a simple and cost effective way while nevertheless providing a high reliability.

The above objects have been achieved according to the invention by a method for operating an electrical drive unit, wherein anti-jamming protection is realized by comparing an excess force ($F_O$) defined as the difference between a driving force ($F_A$) delivered by the drive unit and a friction force ($F_R$) generated by a driven unit, with a trigger threshold value ($F_S$), wherein a characteristic curve of the friction force ($F_R$), which depends on the operating distance (s) of the electrical drive unit, of a present actual driving operation (BV1), is compared with at least one characteristic curve of the friction force ($F_R$) of a past driving operation (BV2 ... BVn), and wherein the trigger threshold value ($F_S$) is varied in response to the conformity between the characteristic curves of the friction force ($F_R$) of the actual driving operation (BV1) and of at least one past driving operation (BV2 ... BVn).

The invention is based on the recognition that an efficient jamming protection is implemented for an electric drive unit or an electric motor drive, if the trigger threshold value is predetermined as a criterion for the recognition of a jamming while taking into account the non-reproducible portion of the friction force. Accordingly friction force curves are ascertained as a function of the friction force during the driving operation for monitoring the electric drive unit with a view to a potential jamming. These friction force curves are ascertained either by directly measuring the forces or by an indirect determination on the basis of the motor parameters: motor current, and/or motor voltage, and/or motor r.p.m. or period duration. These friction force curves of different sequentially occurring driving operations are correlated to each other in the form of a quality coefficient. Thus, the proportion of the friction force, and thus the jamming force, can be ascertained more precisely so that the trigger threshold value can be adjusted to smaller values depending on this quality coefficient. The trigger threshold value depending on the quality coefficient can thus be influenced either globally independently of a position, that is, independent of the operating distance, or it may be adapted while taking the operating distance into account. For example, certain sections of the operating distance need not be taken into account, especially problem sections.

A vector distance is used for ascertaining the quality coefficient that indicates the reproducibility of the friction or of the friction curve of the electrical drive unit. This vector distance characterizes a similarity of curve patterns or functions, that is, the vector distance is a measure for the correspondence of the total force and thus of the friction force or of the friction curve based on several, at least two, driving operations following each other in sequence. The ascertaining is typically done at each driving operation and particularly at an indirect determination of the forces occurring at a driving operation based on motor parameters. This vector distance and thus the quality coefficient can be determined independently of the operating distance of the driving operation (globally or independent of position) based on concepts that characterize the entire driving operation. The vector distance can be determined for example, by Euclidian distances, or depending on the operating distance of the driving operation based on concepts that characterize sections of the driving operation such as Tschebytscheff-distances. The vector distances may alternatively be determined depending on the operating distance of the driving operation based on position depending concepts that characterize the respective operating distance, for example by means of positive distance measures such as the distance value, or the mean distances, or the maximal square distances, etc. The quality coefficient is ascertained with this vector distance while taking into account the non-reproducible portion of the friction force. The quality coefficient may depend on the position. An adaptation of the trigger threshold value, as a criterion for the jamming protection, is realized with the quality coefficient, particularly a force limitation of the electric drive unit is made possible by lowering the trigger threshold value wherever possible.

The number of past driving operations and their respective weighting used for the determination of the quality coefficient is predetermined particularly depending on the desired precision in the determination of the quality coefficient and depending on the operating conditions during the actual driving operation. For example, all considered past driving operations can be represented in one vector which is compared to the actual vector that is determined by means of the friction force curve of the actual driving operation. Particularly, it is also possible to take into account time related influences, for example the time differences between the different driving operations, and temperature influences, for example the absolute temperature of the driving unit during the driving operation, when forming the vector distance and thus when determining the quality coefficient.

The quality coefficient is an indicator for the actual status of the electric driving unit even when taking the non-reproducible portion of the friction force into account. Therefore the trigger threshold value can be adjusted to a justifiable value as a basis for realizing a jamming protection at each driving operation. The adjustment to a justifiable value is possible due to the limiting condition: fall below the maximum jamming force. More specifically, an efficient protection against jamming can be realized for each driving operation with a high reliability, whereby the jamming protection is adapted to the current operating conditions of the electric drive unit. Thus, a large operating range of the electric drive unit is realized without limitations.

The method shall be explained in connection with an example embodiment and with reference to the drawing, wherein.

An electric drive unit, for example for realizing the electric window lifting function in a motor vehicle by a window lift drive of the motor vehicle, comprises a d.c.-motor with permanent excitation as an electric motor, a gear secured to the electric motor, cable pulls for operating the window pane and an electronic module integrated into the door control unit of the motor vehicle. Further, sensors are provided for acquiring the motor voltage and the armature current of the electric motor. For example, sensors already provided in the electric motor for other purposes, may be used for the acquisition. The permanently excited d.c.-motor as electric motor of this electric drive unit comprises a rated power output of, for example, 100 W. A maximum jamming force of, for example, 100 N is permissible for the electric drive unit.

Figure 1:
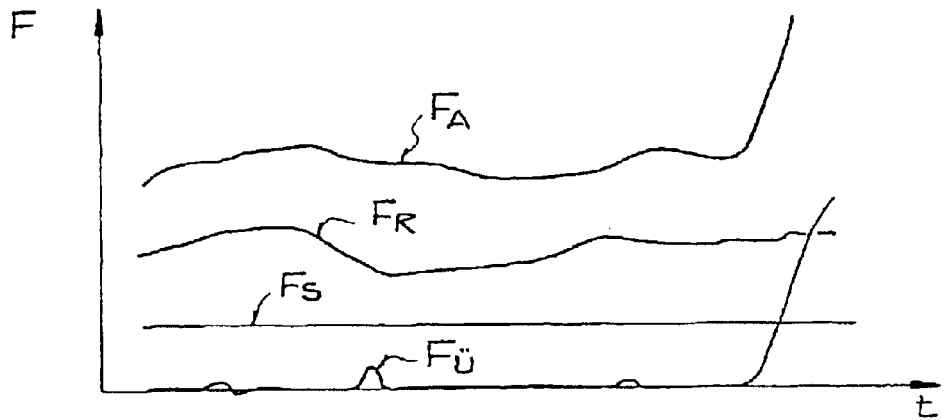
FIG. 1 shows characteristic curves of different forces as a function of time during a driving operation of the electric drive unit.

According to FIG. 1 the forces ascertained, for example indirectly by using motor parameters during a driving operation, are used for realizing a jamming protection. For this purpose the driving force $F_A(t)$ of the electric drive unit is continuously ascertained indirectly by evaluating the motor parameters: motor current and motor r.p.m. or period duration. This ascertained actual drive force $F_A(t)$ is correlated to the friction force $F_R(t)$ which, for example is expected on the basis of past driving operations. More specifically, the excess force $F_O(t)=F_A(t)-F_R(t)$ is formed which indicates by how much the actual driving force deviates from the driving force that is really needed for operating the electric drive unit. In case the excess force $F_O(t)=F_A(t)-F_R(t)$ exceeds the trigger threshold value $F_S$, it is assumed that an obstacle is in the electric drive unit, for example, in connection with the window lifting drive of a motor vehicle, a hand between the window pane and the frame, whereupon suitable measures are taken, such as reversing or stopping of the electric drive unit, in order to avoid a jamming.

As seen from FIG. 1 the interpretation of the trigger threshold value $F_S$ is critical because, per se, contradictory conditions must be satisfied. On the one hand, the jamming protection shall function robustly against changes of the friction force $F_R$ even under extreme environmental conditions, which means erroneous evaluations regarding the jamming are not permitted. On the other hand, a maximum jamming force, for example 100 N, may not be exceeded. Due to the first condition the trigger threshold value $F_S$ must be larger than the non-reproducible portion of the friction force $F_R$ formed on the basis of two sequential driving operations. The non-reproducible portion of the friction force may have been caused by worn-out guides or weather changes. However, to satisfy the second condition the trigger threshold value must be so low that the maximum jamming force is never exceeded, thus it should be clearly below the maximum jamming force because after switching off or reversing or switch-over of the electric drive unit, the electric motor, due to inertia, keeps running in the original direction for a certain time duration.

Figure 2:
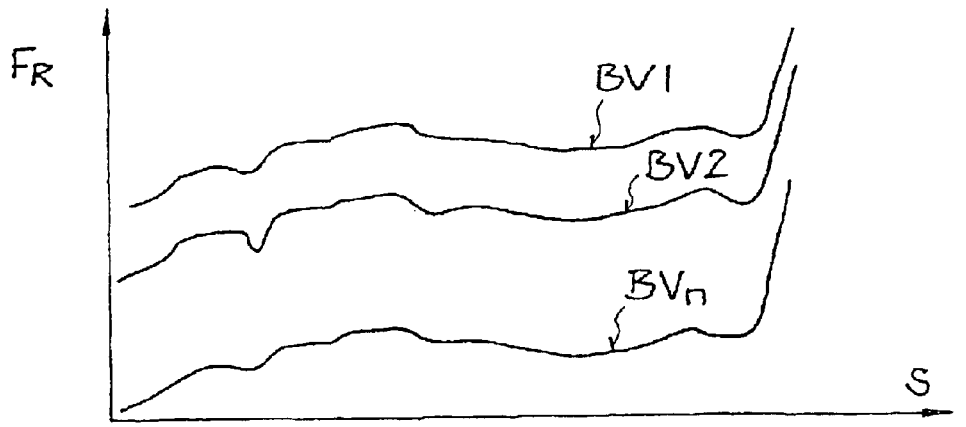
FIG. 2 shows the friction force characteristic curve as a function of position of the electric drive unit during different driving operations.

According to the invention, the jamming protection, for example the indirect jamming protection, is improved by the continuous determination of a quality coefficient G for the reproducibility of the adapted friction force $F_R$. According to FIG. 2, the characteristic curve of the friction force $F_R(s)$ of the electric drive unit is used for determining the quality coefficient G. The characteristic curve depends on the operating distance and is thus position dependent and hence also time dependent. The characteristic curve of the electric drive unit is taken for n different driving operations BV(BV1, BV2, ... BVn), more specifically, the friction characteristic curve $F_{R1}(s); F_{R2}(s); \ldots F_{Rn}(s)$ is used. For example, in addition to using the actual driving operation BV1 with the friction force characteristic curve $F_{R1}(s)$, five further past driving operations BV2 to BV6 having the friction characteristic curve $F_{R2}(s) \ldots F_{R6}(s)$ are used in the determination of the quality coefficient G. Positive vector distances can be ascertained therefrom for example by means of the value of the distance as a distance measure. A quality coefficient G(s) is derived from these vector distances. This quality coefficient is dependent on the position of the electric drive unit and thus on the operating distance s:
Thus:

$$G(s)=-\Sigma|F_{R1}(s)-F_{R(n)}(s)| \quad (1)$$

In the ideal case, more specifically when the friction force $F_R$ is reproducible, the quality coefficient G(s)=O, which means all driving operations BV have the same friction force characteristic curve. If the friction force $F_R$ is hard to reproduce, the quality coefficient G(s) is negative and there is a significant deviation of the friction force characteristic curve of different driving operations BV. If the quality coefficient G(s) lies near the maximal value O in a certain position of the operating distance s, for example for position $s_3$, the trigger threshold value $F_S$ will be reduced, in order to obtain lower maximal jamming forces. If the quality coefficient G(s) assumes strongly negative values in a certain position of the operating distance s, for example in positions s1, s2, s4 and s5, the trigger threshold value $F_s$ will be increased locally, in order to minimize the probability of detection errors. Such detection errors occur more frequently in electric window lifters for example near the sealed closed position or in scissor lifters at the reversing position of the lever mechanism. Thereby, it is possible to realize a position dependent trigger threshold value $F_s$ that is individually adapted to each electric driving unit.

One obtains an improved quality coefficient G(s) for the reproducibility of the adapted friction forces as a function of the operating distance s, by weighting the vector distances, that are defined by equation (1), with a weighting function w(n,s). The weighting function depends on the respective driving operation BV and thus from the actuality of the respective driving operation, as well as on the operating distance s within the respective driving operation BV:
Thus:

$$G(s)=-\Sigma|F_{R1}(s)-F_{R(n)}(s)| \cdot w(n,s). \quad (2)$$

The weighting function w(n,s) is for example defined as a product w(n)·w(s) of a portion or factor w(n) depending on the driving operation BV and a portion or factor w(s) depending on the operating distance s. The factor w(s) depending on the operating distance is, for example equal for all driving operations BV. For example, w(s)=1 for the entire operating distance s, except in the area of the closing or sealing position of the movable component where w(s)= 0.1 for example, is specified. This means that this section of the operating distance s is taken into account only slightly. The factor w(n) depending on the driving operation BV comprises, for example a time related weighting, particularly with regard to the actuality of the respective driving operation BV, for example, w(n)=1 for the preceding driving operation. For all driving operations BV further in the past, w(n) is correspondingly smaller. If, for example five driving operations BV are taken into account, w(n)=0.1 for instance, is specified for the last driving operation BV still being taken into account. In the factor w(n) particularly the absolute time difference between the individual driving operations BV and the temperature during the respective driving operation BV can be taken into account.

Figure 3:
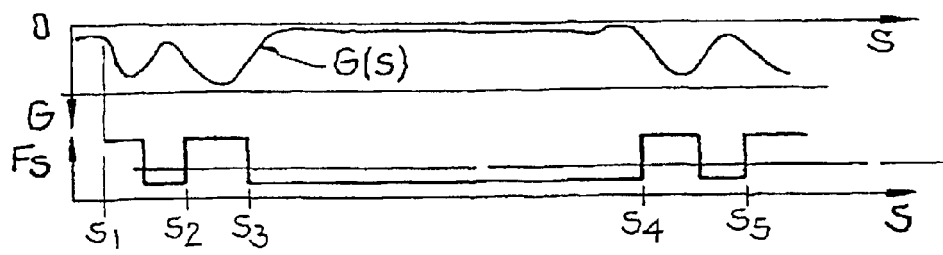
FIG. 3 shows a jamming instance with characteristic curves of different forces as a function of time.
Figure 3:
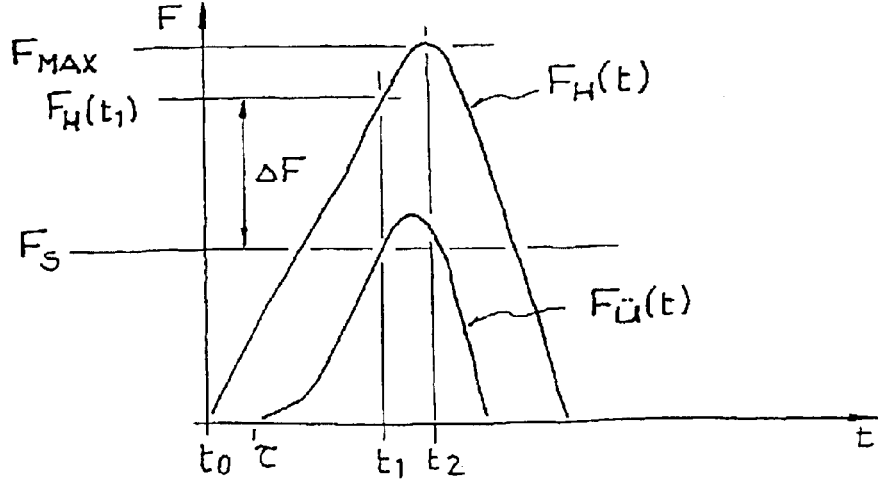

FIG. 3 shows a jamming and the respective force characteristic curves. More specifically, an obstacle having the elasticity D is jammed in an electric drive unit having the approximately constant speed v and starting at the point of time $t_0=O$. Upon jamming a force $F_H(t)$ occurs in the obstacle:

$$F_H(t)=D \cdot v \cdot (t-t_0)=D \cdot v \cdot t.$$

The excess force $F_O(t)$, which is indirectly determined, is obtained as:

$$F_O(t)=F_H(t)-F_R(t)=D \cdot v \cdot (t-\tau),$$

wherein $\tau$ is the delay time due to the inertia of the electric drive unit particularly the electric motor with the indirect determination of the excess force $F_O$. Thus, a difference force $\Delta F$ exists between the force $F_H(t)$ in the obstacle and the excess force $F_O(t)$. The difference force is a measure for the effect of the force increase on the obstacle:

$$\Delta F = F_H(t) - F_0(t) = D \cdot v \cdot \tau$$

For typical values of the delay time $\tau$ of 20 ms, the elasticity D of, for instance 20 N/mm, and a speed v of the electrical drive unit of, for example 120 mm/s one obtains, for example a difference force $\Delta F$ of 48N.

The non-reproducible portion of the friction force $F_R(t)$ amounts to for instance 20N in the worst case, so that the trigger threshold value $F_s$ must also be at least 20N because otherwise a jamming would be assumed already on the basis of effects that are inherent in the system, such as different degrees of hard running etc. At the time $t_1$ when the excess force $F_O$ becomes equal to the trigger threshold value $F_s$, $F_0(t_1) = F_S$, the force $F_H$ in the obstacle is larger, by the difference force $\Delta F$, than the excess force $F_0(t)$ or the trigger threshold value $F_s$. Therefore, at the point of time $t_1$ the force $F_H$ in the obstacle already amounts to:

$$F_H(t_1) = F_s + \Delta F = 20N + 48N = 68N.$$

At the time $t_1$ countermeasures are initiated, for instance the electric motor and thus the electric drive unit is reversed. Due to the inertia of the electric drive unit, particularly the electric motor, the force $F_H(t)$ in the obstacle rises up to the point of time $t_2$. More specifically, at the point of time $t_2$ the maximal force $F_{MAX}$ is reached, for instance $F_{MAX} = 90N$. Thus, the requirement for a maximal jamming force $F_{MAX}$ of 100N at the most in the obstacle when the jamming occurs is satisfied. However, the difference between the maximal jamming force $F_{MAX}$ of 90N and the permissible 100 N is only 10N representing the "safety zone".

If the quality coefficient and thus the reproducibility of the friction force $F_R$ permits it, at the position assumed at the point of time $t_O$ or at the operating distance traversed at point of time $t_O$, the trigger threshold value $F_s$ is reduced to a smaller value at this position, for example from 20N to 10N. Thereby, when jamming occurs the force $F_H$ in the obstacle and particularly the maximal jamming force $F_M$ is reduced. According the above example case $F_{MAX}$ is reduced from $F_{MAX} = 90N$ to $F_{MAX} = 65N$ whereby the "safety zone" is increased form 10N to 35N in the above example.

What is claimed is:

1. A method for operating an electrical drive unit, wherein anti-jamming protection is realized by comparing an excess force ($F_O$) defined as the difference between a driving force ($F_A$) and a friction force ($F_R$), with a trigger threshold value ($F_S$), comprising the following steps:

a) comparing a characteristic curve of said friction force ($F_R$), which depends on an operating distance (s) of the electrical drive unit, of a present driving operation (BV1) with at least one characteristic curve of a friction force ($F_R$) of a past driving operation (BV2 ... BVn), b) and varying said trigger threshold value ($F_S$) in response to the conformity between the characteristic curve of the friction force ($F_R$) of the present driving operation (BV1) and at least one past driving operation (BV2 ... BVn).

2. The method of claim 1, further comprising defining a quality coefficient (G) as a measure for said conformity between the characteristic curves of the friction force ($F_R$) of said present driving operation (BV1) and of at least one past driving operation.

3. The method of claim 2, further comprising determining said quality coefficient (G) on the basis of vector distances between different characteristic curves, which vector distances characterize the correlation between different characteristic curves.

4. The method of claim 3, further comprising using distance measures depending on said operating distance (s) for determining said vector distances.

5. The method of claim 3, further comprising determining said vector distances by using distance measures which summarize certain sections of said operating distance (s).

6. The method of claim 3, further comprising using distance measures that are independent of said operating distance (s), for determining said vector distances.

7. The method of claim 3, further comprising defining said quality coefficient (G) as a product of said vector distances and a weighting function (w(n,s)).

8. The method of claim 7, further comprising allocating to said weighting function (w(n,s)) a first portion depending on a respective driving operation (BV) and a second portion depending on said operating distance (s) of said respective driving operation (BV).

9. The method of claim 8, further comprising predetermining a portion of said weighting function (w(n,s)) depending on said respective driving operation (BV) and depending on a time difference between individual driving operations.

10. The method of claim 8, further comprising predetermining a portion of said weighting function (w(n,s)) depending on said respective driving operation (BV) and depending on a temperature of said respective driving operation (BV).

11. The method of claim 8, further comprising predetermining that a portion of said weighting function depending on said operating distance (s), is the same for all driving operations.

12. The method of claim 11, further comprising disregarding certain sections of said operating distance (s) when determining said weighting function (w(n,s)).

13. The method of claim 1, further comprising determining said excess force ($F_O$) indirectly from motor characteristic values.

14. The method of claim 13, further comprising using any one or more of the following motor characteristic values, a motor current (I), a motor voltage (U), and a motor r.p.m. (n) in determining said excess force ($F_O$).

* * * * *

UNITED STATES PATENT AND TRADEMARK OFFICE
CERTIFICATE OF CORRECTION

PATENT NO. : 6,870,339 B2
DATED : March 22, 2005
INVENTOR(S) : Kessler et al.

It is certified that error appears in the above-identified patent and that said Letters Patent is hereby corrected as shown below:

Title page,
Item [57], ABSTRACT, delete and replace the ABSTRACT to read as follows:

```
--An electric motor drive is provided with an anti-jamming
protection.  An excess force, which is the difference between a
driving force and a friction force, is compared with a trigger
threshold.  To this end, the curve of the friction force of a
present actuation of the drive, which actuation depends on the
actuation path of the electrical drive unit is compared with
the curve of the friction force of at least one previous
actuation operation.  Then a trigger threshold value is
modified according to how the friction force curves of a
present and at least one past actuation correspond to each
other.  These steps provide anti-jamming protection
particularly for an electrical drive unit for window lifting
drives.--;
```

Column 6,
Lines 7 and 13, after "value", replace "$F_s$" by -- $F_S$ --;

Column 7,
Lines 12, 16 and 19, after "value", replace "$F_s$" by -- $F_S$ --;
Lines 17 and 18, replace "$F_o$" by -- $F_0$ --;
Line 41, after "According" insert -- to --.

Signed and Sealed this

Twelfth Day of July, 2005

JON W. DUDAS
*Director of the United States Patent and Trademark Office*